US010845584B2

(12) United States Patent
Hashimoto

(10) Patent No.: US 10,845,584 B2
(45) Date of Patent: Nov. 24, 2020

(54) SCANNING LASER MICROSCOPE

(71) Applicant: OLYMPUS CORPORATION, Hachioji (JP)

(72) Inventor: Katsuyuki Hashimoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 85 days.

(21) Appl. No.: 16/222,396

(22) Filed: Dec. 17, 2018

(65) Prior Publication Data
US 2019/0187448 A1 Jun. 20, 2019

(30) Foreign Application Priority Data
Dec. 20, 2017 (JP) .................................. 2017-243349

(51) Int. Cl.
*G02B 21/00* (2006.01)
(52) U.S. Cl.
CPC ....... *G02B 21/0048* (2013.01); *G02B 21/008* (2013.01); *G02B 21/0032* (2013.01)
(58) Field of Classification Search
CPC .......................... G02B 21/002; G02B 21/0032
See application file for complete search history.

(56) References Cited

U.S. PATENT DOCUMENTS

| 2007/0272843 A1* | 11/2007 | Sasaki | ................... | G02B 21/16 |
| | | | | 250/234 |
| 2015/0362714 A1* | 12/2015 | Iga | ......................... | G02B 21/06 |
| | | | | 359/372 |

FOREIGN PATENT DOCUMENTS

JP 2012073551 A 4/2012

* cited by examiner

*Primary Examiner* — William C Vaughn, Jr.
*Assistant Examiner* — Jerry T Jean Baptiste
(74) *Attorney, Agent, or Firm* — Holtz, Holtz & Volek PC

(57) ABSTRACT

A scanning laser microscope includes: an objective lens; an XY scanner; a Z scanner; a detector that detects fluorescence from a sample and that outputs luminance information; an image processor that generates an image based on the luminance information and scanning-position information; and a controller that controls these components, wherein while the controller shifts the scanning line by the XY scanner each time the controller scans one line by the XY scanner, the controller changes the scanning position in forward and return paths of the direction along the optical axis of the objective lens by the Z scanner, reverses, between the forward and return path, an orientation in which the scanning line is shifted by the XY scanner, and reverses, about an axial line along the main scanning direction, either the image of the plane in the forward path or the image of the plane in the return path.

4 Claims, 7 Drawing Sheets

FIG. 5
XY IMAGE IN Z FORWARD PATH
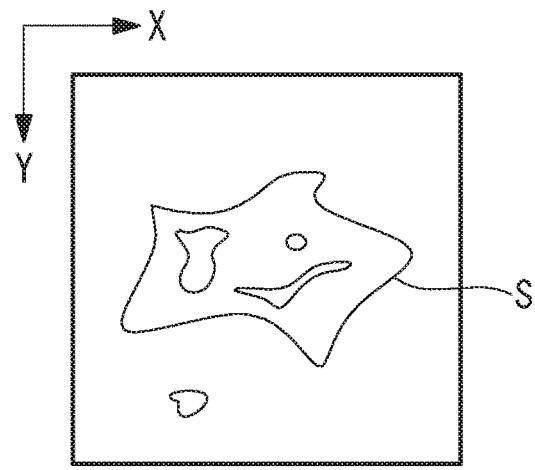
FIG. 6
XY IMAGE IN Z RETURN PATH
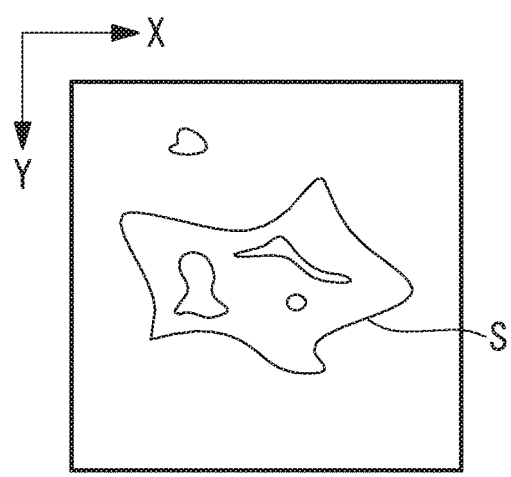
PROCESSED XY IMAGE IN Z RETURN PATH
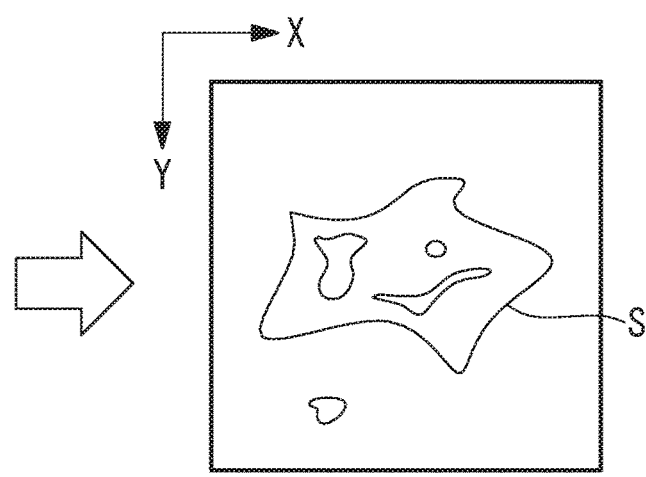

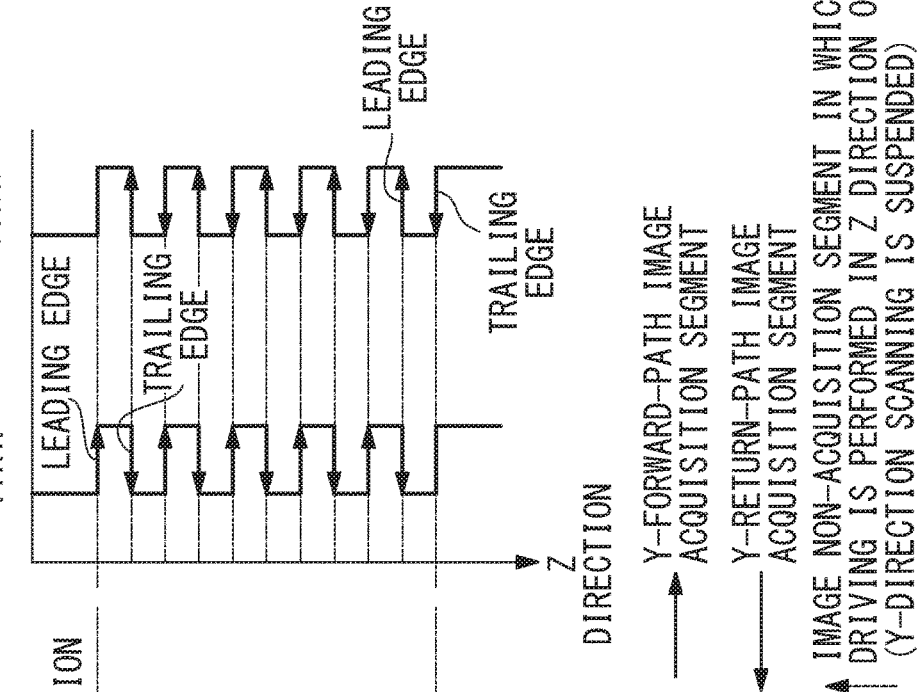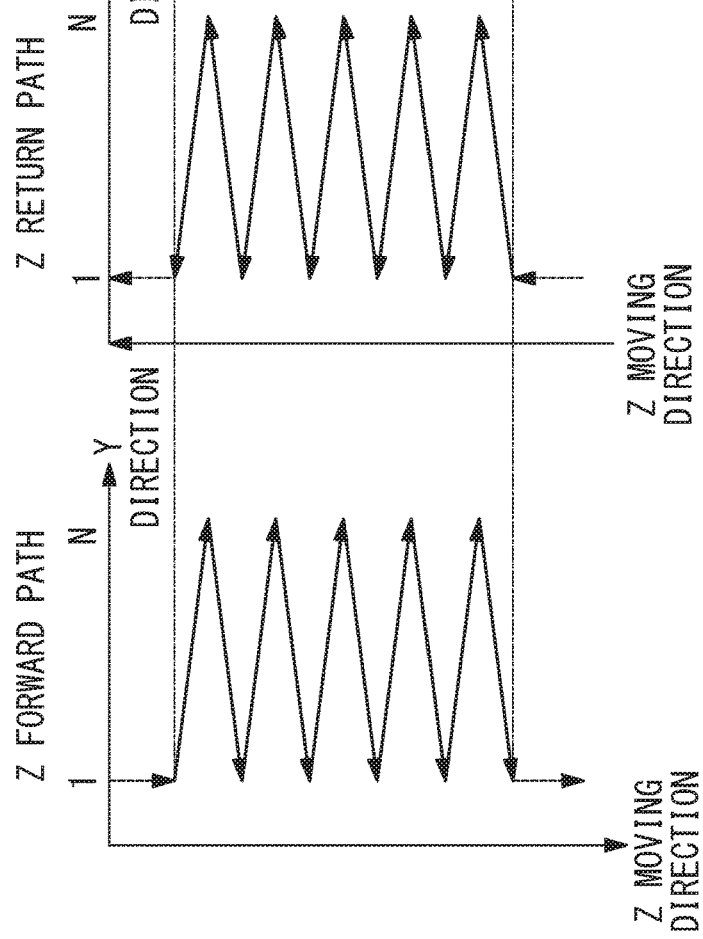

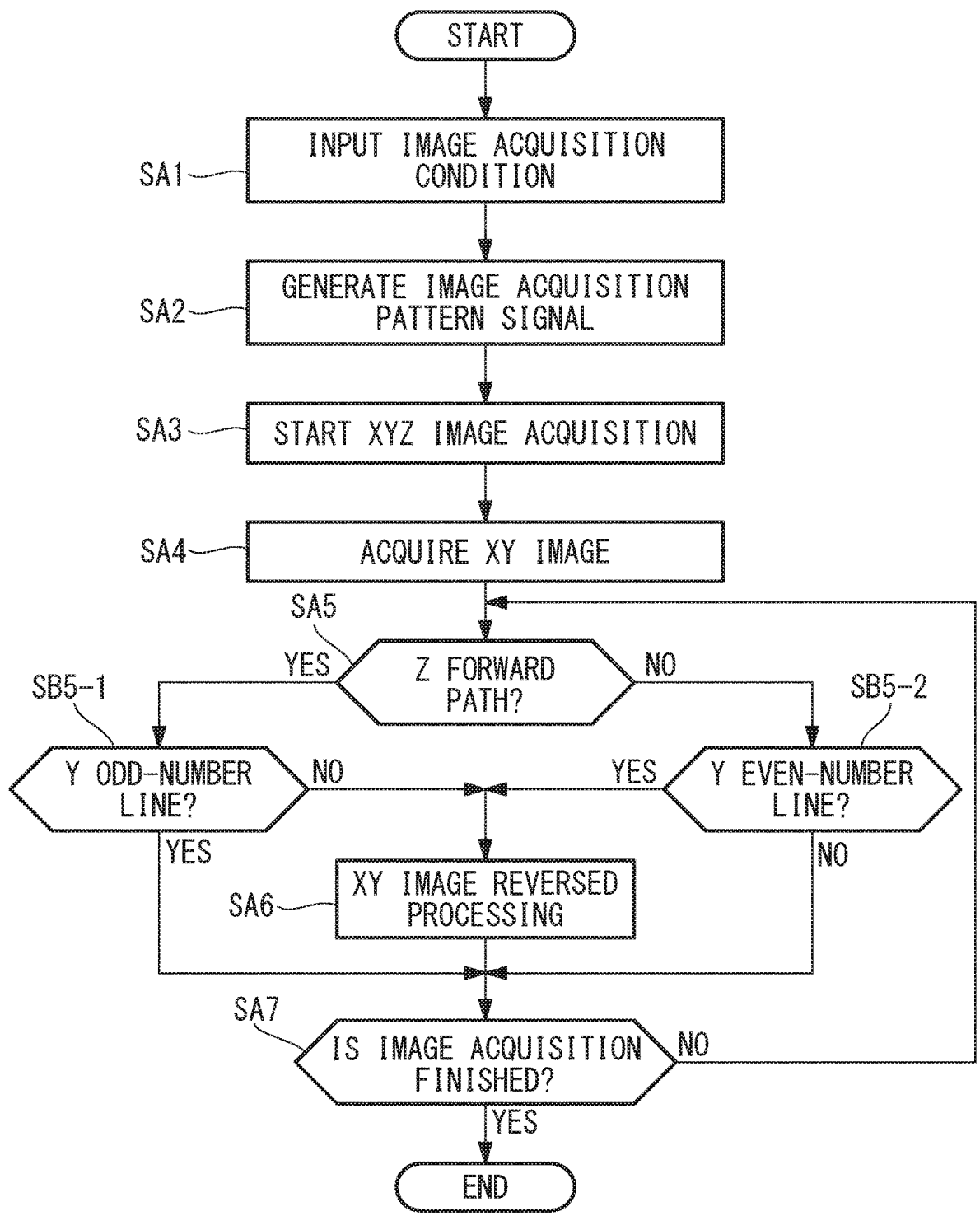

SCANNING LASER MICROSCOPE

CROSS-REFERENCE TO RELATED APPLICATIONS

This application is based on Japanese Patent Application No. 2017-243349, the content of which is incorporated herein by reference.

TECHNICAL FIELD

The present invention relates to scanning laser microscopes.

BACKGROUND ART

There are known scanning laser microscopes for performing three-dimensional scanning (refer to, for example, Patent Literature 1). In the scanning laser microscope described in Patent Literature 1, a laser beam is two-dimensionally scanned in X and Y directions intersecting the optical axis of an objective lens while changing the relative distance between the objective lens and a specimen in a Z direction along the optical axis of the objective lens.

CITATION LIST

Patent Literature

{PTL 1}
Japanese Unexamined Patent Application, Publication No. 2012-73551

Solution to Problem

One aspect of the present invention is a scanning laser microscope including: an objective lens through which a specimen is irradiated with a laser beam emitted from a light source; a scanning part that two-dimensionally scans the laser beam radiated through the objective lens on the specimen; a scanning-position changing part that changes a scanning position of the laser beam in a direction along an optical axis of the objective lens during scanning by means of the scanning part; a detection unit that detects observation light from the specimen irradiated with the laser beam and that outputs luminance information corresponding to the luminance of the observation light; an image generation unit that generates an image on the basis of the luminance information output from the detection unit and scanning-position information indicating the scanning position of the laser beam, determined by the scanning part and the scanning-position changing part; and a control unit that controls the scanning part, the scanning-position changing part, and the image generation unit, wherein while the control unit shifts a scanning line by means of the scanning part in a sub scanning direction intersecting a main scanning direction which is along a plane intersecting the optical axis of the objective lens each time the control unit scans one line by means of the scanning part in the main scanning direction, the control unit changes the scanning position in forward and return paths of the direction along the optical axis by means of the scanning-position changing part, reverses, between the forward path and the return path of the direction along the optical axis, an orientation in which the scanning line in the sub scanning direction is shifted by the scanning part, and reverses, about an axial line along the main scanning direction, either an image of the plane in the forward path or an image of the plane in the return path generated by the image generation unit.

BRIEF DESCRIPTION OF DRAWINGS

FIG. 5 is a diagram depicting one example of an XY image of a sample acquired in the Z forward path.

FIG. 6 is a diagram depicting one example of an XY image of a sample acquired in the Z return path, as well as an XY image produced by applying reversed processing thereto.

FIG. 8A is a diagram depicting the relationship between the moving directions of the Z scanning part in the Z forward path and the Z return path, and Y-forward-path image acquisition segments and Y-return-path image acquisition segments in a scanning laser microscope according to a second embodiment of the present invention.

FIG. 8B is a diagram depicting one example of image acquisition timing signals in the Z forward path and the Z return path of the scanning laser microscope according to the second embodiment of the present invention.

FIG. 9 is a flowchart for illustrating the steps of acquiring a three-dimensional image of a sample using the scanning laser microscope in FIG. 2.

DESCRIPTION OF EMBODIMENTS

First Embodiment

Figure 1:
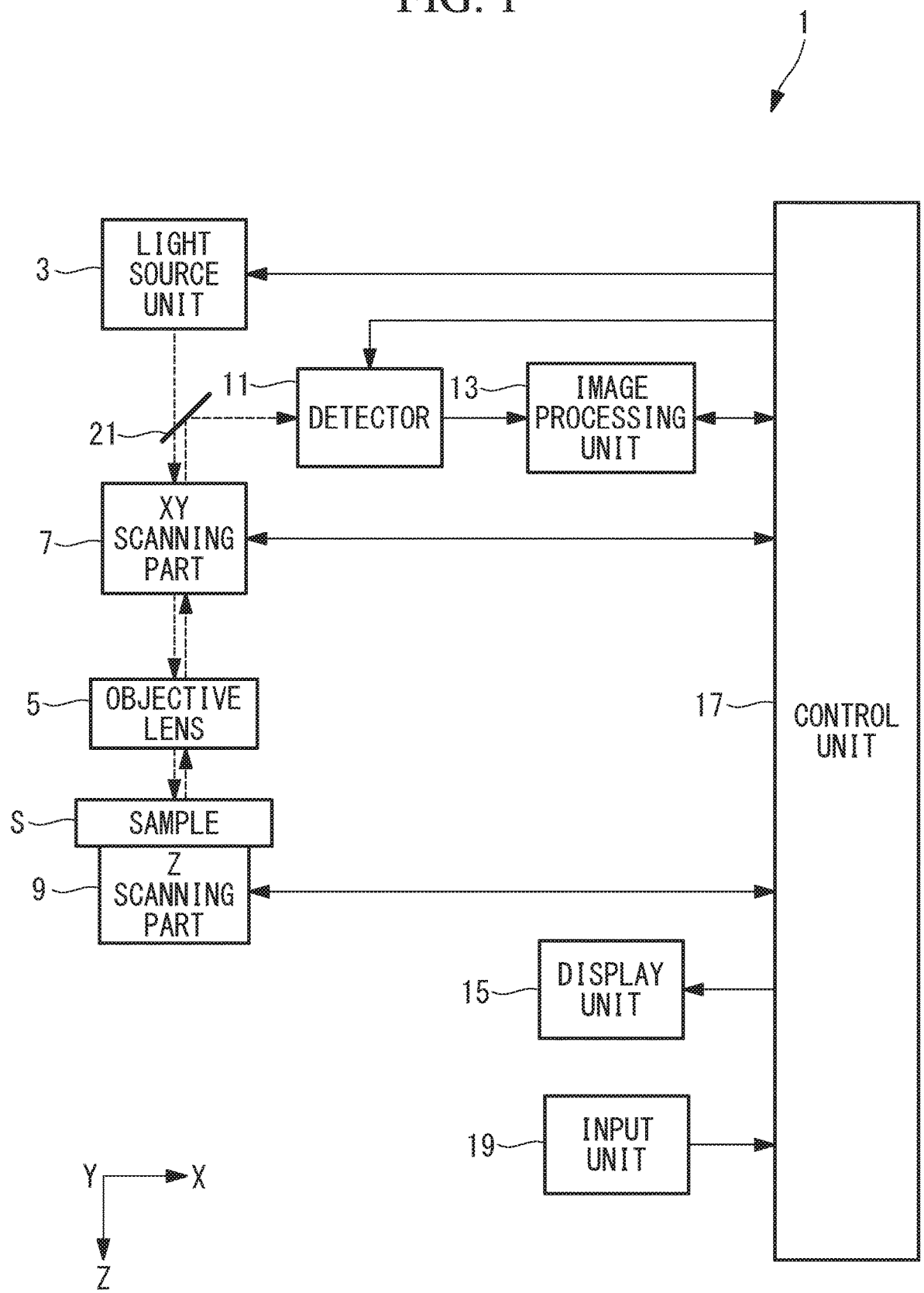
FIG. 1 is a schematic diagram showing the configuration of a scanning laser microscope according to a first embodiment of the present invention.

A scanning laser microscope according to a first embodiment of the present invention will now be described with reference to the drawings.

A scanning laser microscope 1 according to this embodiment is, for example, an upright microscope. This scanning laser microscope 1 includes: a light source unit (light source) 3 for generating a laser beam; an objective lens 5 for irradiating a sample (specimen) S with the laser beam emitted from the light source unit 3; an XY scanning part 7 for two-dimensionally scanning the laser beam on the sample S in directions intersecting the optical axis of the objective lens 5; a Z scanning part (scanning-position changing part) 9 for changing the scanning position of the laser beam in a direction along the optical axis of the objective lens 5; a detector (detection unit) 11 for detecting fluorescence (observation light) emitted from the sample S; an image processing unit (image generation unit) 13 for generating an image of the sample S; a display unit 15 for displaying the image etc. generated by the image processing unit 13; a control unit 17 for controlling these components; and an input unit 19 for allowing a user to input instructions. Reference sign 21 denotes a dichroic mirror. Hereinafter, a direction along the optical axis of the objective lens 5 is defined as the Z direction, and directions that are orthogonal to the Z direction and that are orthogonal to each other are defined as the X direction and the Y direction.

The XY scanning part 7 is a resonant scanner formed by arranging, adjacent to each other, a single resonant mirror (not shown in the figure) and a single galvanometer mirror (not shown in the figure) that are swiveled in swiveling planes orthogonal to each other. This XY scanning part 7 is configured to be capable of scanning a laser beam at high speed in a main scanning direction (e.g., X direction) by means of the resonant mirror and also scanning the laser beam at relatively low speed in a sub scanning direction (e.g., Y direction) by means of the galvanometer mirror. A two-dimensional XY image intersecting the optical axis of the objective lens 5 can be acquired by scanning the laser beam in the X direction and the Y direction by means of the XY scanning part 7.

The Z scanning part 9 is a stage on which the sample S can be placed. This Z scanning part 9 includes a drive unit (not shown in the figure), such as a stepper motor or a piezo actuator, and can move in the Z direction with the sample S mounted thereon. The focal position of the objective lens 5 in the sample S can be changed in the Z direction by moving the Z scanning part 9 in the Z direction.

The dichroic mirror 21 transmits a laser beam emitted from the light source unit 3 towards the XY scanning part 7 and reflects, towards the detector 11, the fluorescence that returns along the optical path of the laser beam via the XY scanning part 7 after being generated in the sample S and collected by the objective lens 5.

The detector 11 is, for example, a photomultiplier tube and outputs luminance information corresponding to the luminance of the detected fluorescence.

The image processing unit 13 is configured to generate an image on the basis of the luminance information output from the detector 11, as well as scanning-position information indicating the XY-direction positions of the laser beam determined by the XY scanning part 7 and the Z-direction position of the laser beam determined by the Z scanning part 9.

The input unit 19 is, for example, a mouse or a keyboard and allows the user to input image acquisition conditions, such as a Z moving distance by which the Z scanning part 9 moves in the Z direction while acquiring a plurality of XY images and the number of Z reciprocations indicating the number of repetitions that the Z scanning part 9 reciprocates by the Z moving distance.

Figure 2:
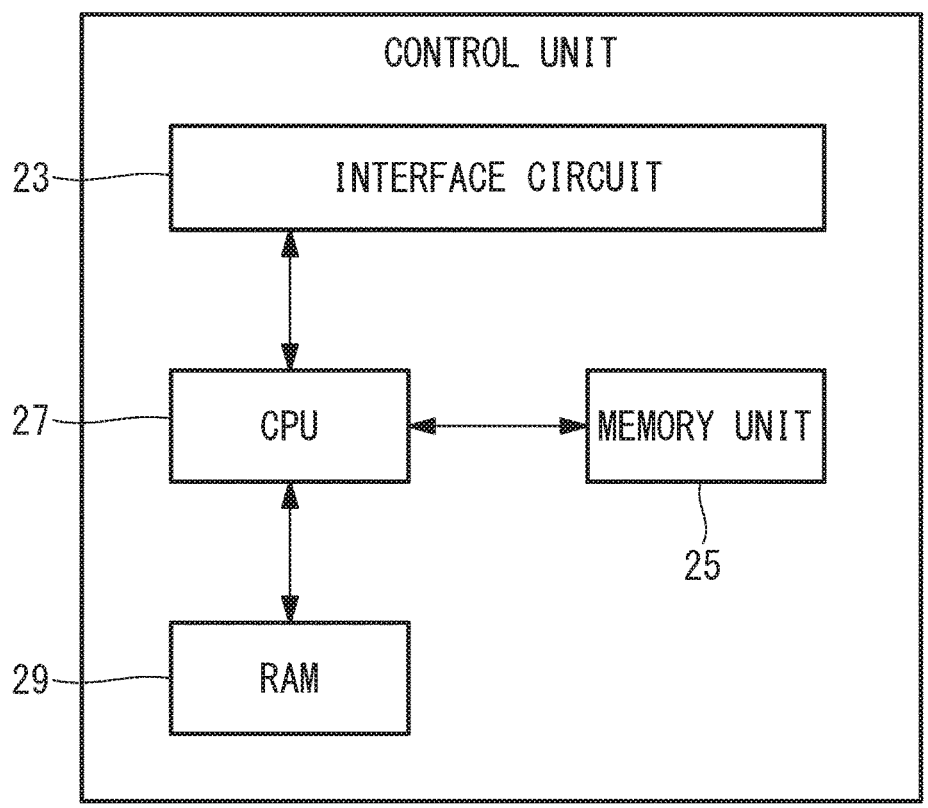
FIG. 2 is a block diagram showing details of a control unit in FIG. 1.

As shown in FIG. 2, the control unit 17 includes: an interface circuit 23 for exchanging signals among the light source unit 3, the XY scanning part 7, the Z scanning part 9, the detector 11, and the display unit 15; a memory unit 25, such as a hard disk drive (HDD), for storing various types of programs etc.; a central processing unit (CPU) 27 for executing various types of programs stored in the memory unit 25; and a random access memory (RAM) 29 for temporarily storing programs read out from the memory unit 25.

Figure 3:
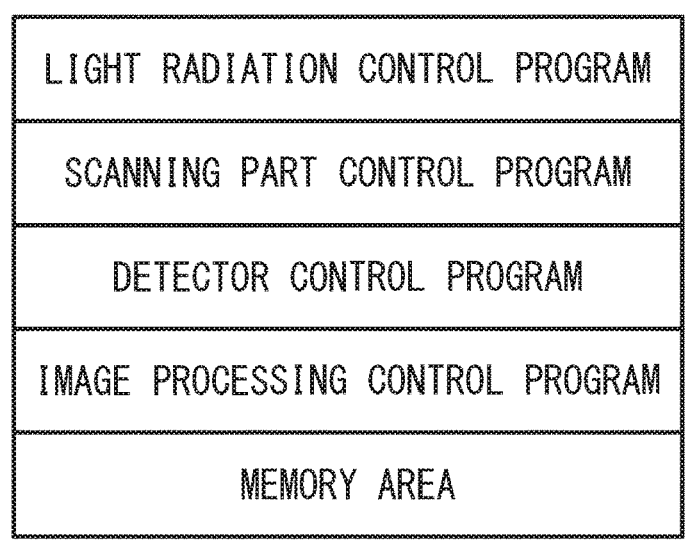
FIG. 3 is a diagram depicting one example of programs stored in a memory unit in FIG. 2.

As shown in FIG. 3, the memory unit 25 stores a light radiation control program, a scanning part control program, a detector control program, and an image processing control program. In addition, the memory unit 25 stores image information generated by the image processing unit 13.

The CPU 27 reads, into the RAM 29, each of the above-described programs stored in the memory unit 25 and executes the read-out program. For example, by executing the light radiation control program, the CPU 27 sets the laser power of the light source unit 3 to control the generation of a laser beam.

In addition, by executing the scanning part control program, the CPU 27 controls laser beam scanning performed by the XY scanning part 7 and the Z-direction movement of the Z scanning part 9. More specifically, each time scanning of one line is performed by the resonant mirror of the XY scanning part 7 in the main scanning direction (X direction) along a plane intersecting the optical axis of the objective lens 5, the CPU 27 shifts the scanning line in the sub scanning direction (Y direction) by means of the galvanometer mirror.

In addition, while causing the XY scanning part 7 to scan a laser beam in the X direction and Y direction as described above, the CPU 27 moves the Z scanning part 9 in the forward path and return path of the Z direction to change the scanning position of the laser beam in the Z direction. In addition, between the Z-direction forward path (hereinafter, referred to as a Z forward path) and the Z-direction return path (hereinafter, referred to as a Z return path) in the Z-direction movement of the Z scanning part 9, the CPU 27 reverses the orientation in which the scanning line is shifted in the sub scanning direction by means of the galvanometer mirror of the XY scanning part 7.

Figure 4:
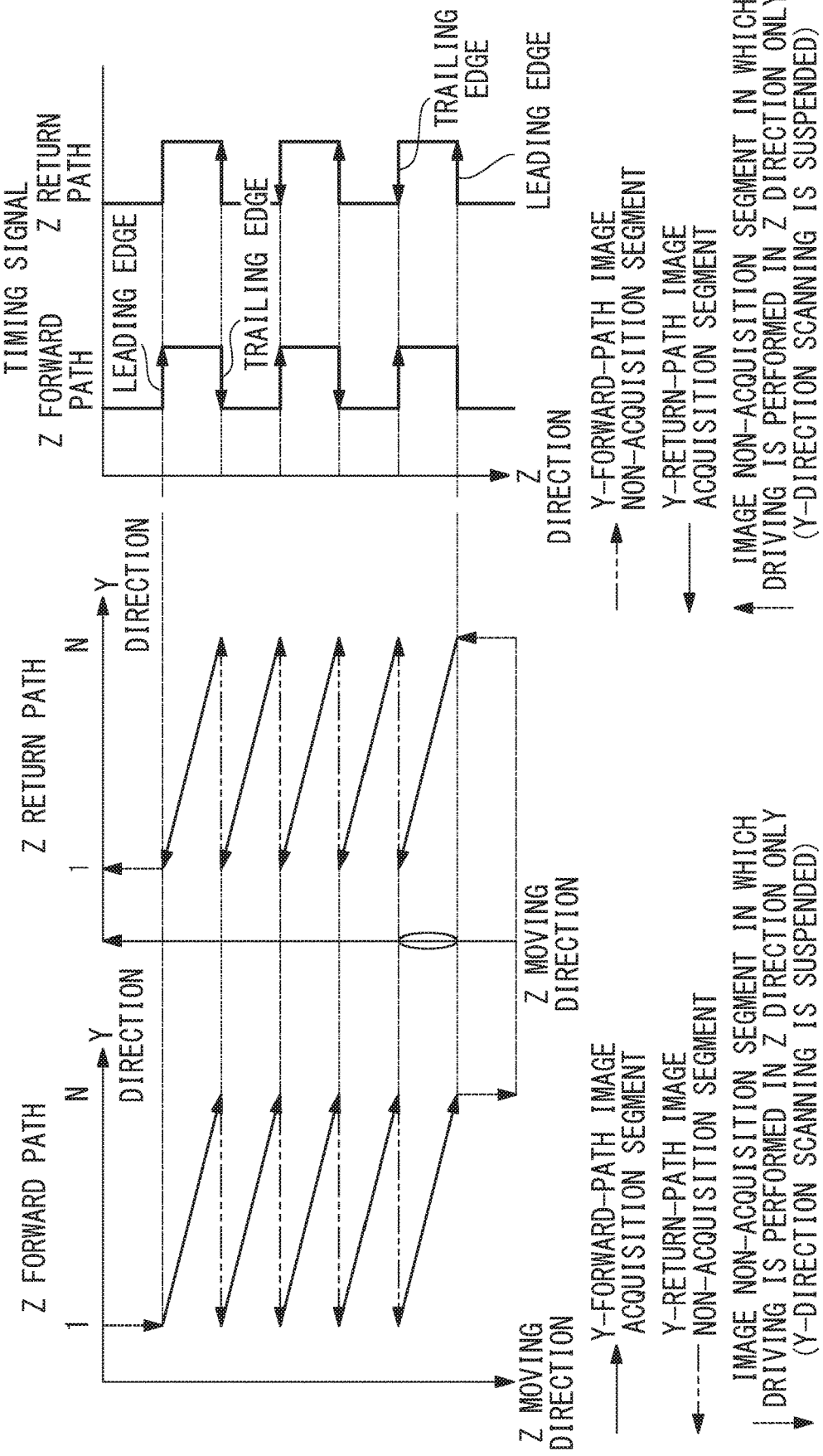
FIG. 4A is a diagram depicting the relationship between the moving directions of a Z scanning part in a Z forward path and a Z return path, and image acquisition segments and image non-acquisition segments in the scanning laser microscope according to the first embodiment of the present invention.
FIG. 4B is a diagram depicting one example of image acquisition timing signals in the Z forward path and the Z return path of the scanning laser microscope according to the first embodiment of the present invention.

More specifically, as shown in FIG. 4A, the CPU 27 repeats the operation of causing the XY scanning part 7 to shift the scanning line to the end in the sub scanning direction and then return, without performing scanning, the laser beam to the first scanning line in the sub scanning direction, and when the laser beam scanning position that is changed by the Z scanning part 9 reaches the end in the Z forward path, the CPU 27 reverses the orientation in which the scanning line in the sub scanning direction is shifted by the XY scanning part 7, thus folding back, to the Z return path, the laser beam scanning position that is changed by the Z scanning part 9.

FIG. 4A shows the relationship between: the Z-direction moving orientations of the Z scanning part 9; and image acquisition segments and image non-acquisition segments in the sub scanning direction. In this embodiment, scanning is performed as follows in the case of the Z forward path. That is, in the Y-direction forward path (hereinafter, referred to as a Y forward path), the scanning line is shifted in the sub scanning direction (corresponding to the Y-forward-path image acquisition segments, as indicated by the solid-line right-pointing arrows on the drawing) while scanning a laser beam in the main scanning direction, whereas in the Y-direction return path (hereinafter, referred to as Y return path), the laser beam is returned to the first scanning line (1) in the sub scanning direction (corresponding to the Y-return-path image non-acquisition segments, as indicated by the two-dot-chain-line left-pointing arrows on the drawing) without scanning the laser beam. In addition, scanning is performed as follows in the case of the Z return path. That is, in the Y forward path, the laser beam is moved to the last scanning line (N) in the sub scanning direction (corresponding to the Y-forward-path image non-acquisition segments, as indicated by the two-dot-chain-line right-pointing arrows on the drawing) without scanning the laser beam, whereas in the Y return path, the scanning line is shifted in the opposite direction to the sub scanning direction (corresponding to the Y-return-path image acquisition segments, as indicated by the solid-line left-pointing arrows on the drawing) while scanning the laser beam in the main scanning direction. Furthermore, the dashed-line arrows in FIG. 4A indicate the timing at which image acquisition in the Z forward path finishes and image acquisition is switched to the Z return path, namely, a segment in which the moving orientation of the Z scanning part 9 in the Z direction is reversed (image non-acquisition segment in which driving is performed in the Z direction only (Y-direction scanning is suspended)). This segment is an image non-acquisition segment, and the galvanometer mirror of the XY scanning part 7 for scanning in the sub scanning direction is halted in this segment.

In addition, in order to achieve image acquisition patterns as shown in FIG. 4A, the CPU 27 generates image acquisition pattern signals, such as the image acquisition timing signals as shown in FIG. 4B and a Y-axis driving signal for the XY scanning part 7, on the basis of the image acquisition conditions input by the user using the input unit 19.

As shown in FIG. 4B, the image acquisition timing signals in the Z forward path and in the Z return path, respectively, share a common signal waveform. The image acquisition timing signal in the Z forward path extends from top to bottom, as shown on the left in the drawing of FIG. 4B, and the image acquisition timing signal in the Z return path extends from bottom to top, as shown on the right in the drawing of FIG. 4B. Image acquisition timings correspond to the leading and trailing edges of the waveform signals both in the Z forward path and in the Z return path. In addition, the image acquisition timing signal for the Z forward path has a timing shifted from the timing of the image acquisition timing signal for the Z return path such that the same plane is scanned both in the Z forward path and in the Z return path using the image acquisition timing signals sharing the common signal waveform. More specifically, the timings of the image acquisition timing signals are shifted from each other between the Z forward path and the Z return path such that the Z position at which image acquisition starts is shifted by the Z-direction displacement by which the Z scanning part 9 moves while acquiring a single XY image.

The Y-axis driving signal has a driving pattern that causes the galvanometer mirror of the XY scanning part 7 to shift the scanning line in the sub scanning direction in the case of the Z forward path and to shift the scanning line in the opposite direction to the sub scanning direction in the case of the Z return path. As shown in FIG. 4A, in the case of the Z forward path, the Y forward path corresponds to image acquisition segments, and the Y return path corresponds to image non-acquisition segments (retrace line time periods), whereas in the case of the Z return path, the Y forward path corresponds to image non-acquisition segments (retrace line time periods), and the Y return path corresponds to image acquisition segments.

In addition, by executing the detector control program, the CPU 27 controls a high voltage (HV, voltage) applied to the detector 11. In addition, by executing the image processing program, the CPU 27 controls image generation performed by the image processing unit 13. More specifically, the CPU 27 applies image processing to either the XY image of a plane in the sample S, said plane intersecting the optical axis of the objective lens 5, acquired in the Z forward path as shown in FIG. 5 or the XY image of a plane in the sample S, said plane intersecting the optical axis of the objective lens 5, acquired in the Z return path, as shown on the left in the drawing of FIG. 6, thereby reversing one of these XY images about an axial line along the main scanning direction (X direction). In this embodiment, the XY image acquired in the Z return path (figure on the left in the drawing of FIG. 6) is reversed. Note that the figure on the right in the drawing of FIG. 6 (image after XY processing in the Z return path) shows a reversed image.

Figure 7:
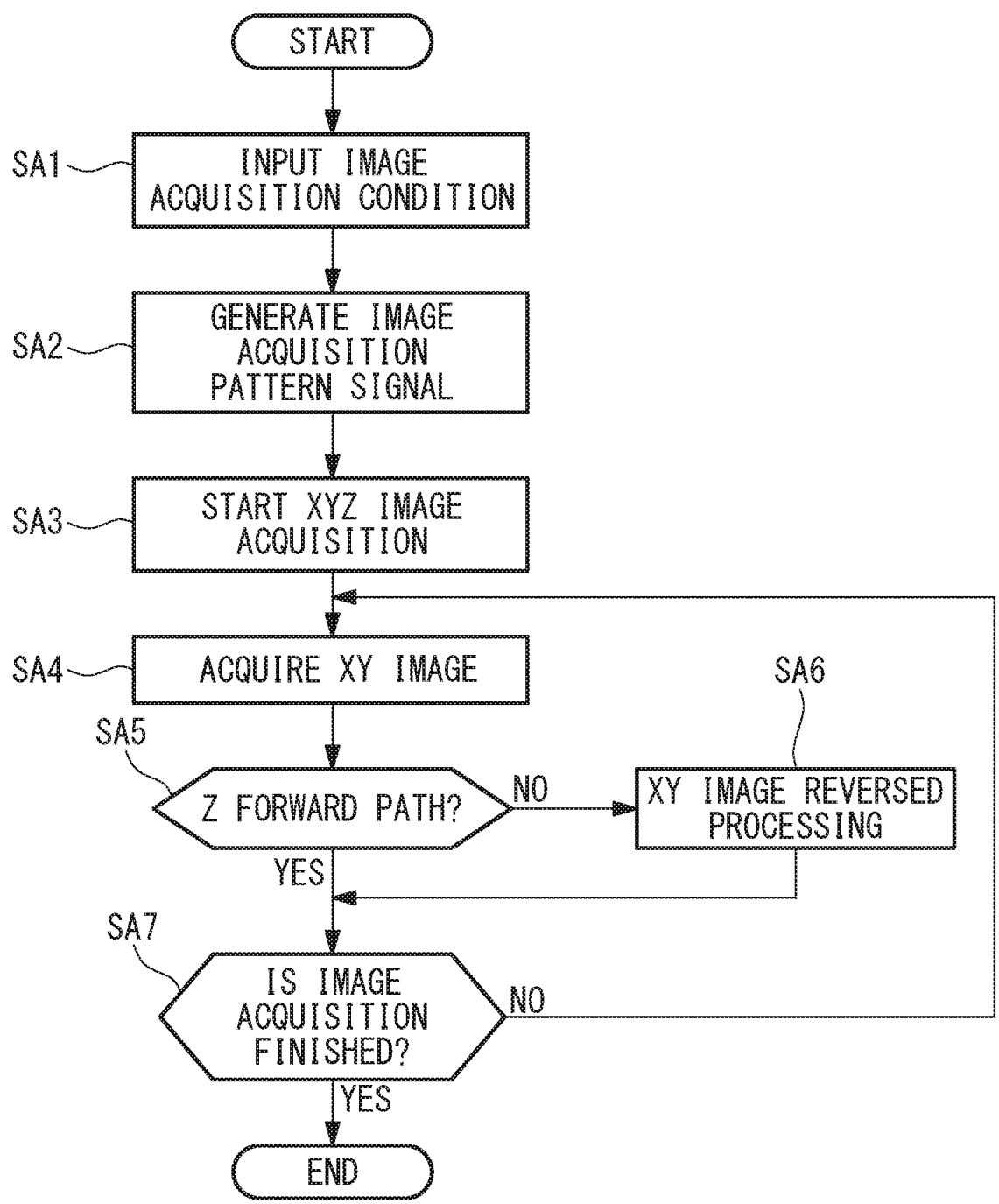
FIG. 7 is a flowchart for illustrating the steps of acquiring a three-dimensional image of a sample using the scanning laser microscope in FIG. 1.

The operation of the scanning laser microscope 1 with the above-described structure will be described below with reference to the flowchart in FIG. 7.

In order to perform fluoroscopy of the sample S using the scanning laser microscope 1 according to this embodiment, the user first uses the input unit 19 and inputs image acquisition conditions, such as the Z-direction moving distance of the Z scanning part 9 and the number of Z reciprocations performed by the Z scanning part 9 (step SA1).

Next, through the operation of the CPU 27 of the control unit 17, image acquisition pattern signals, such as the image acquisition timing signals as shown in FIG. 4B and the Y-axis driving signal for the Z scanning part 9, are generated according to the image acquisition conditions input using the input unit 19 (step SA2).

Next, XYZ image acquisition (three-dimensional image acquisition) of the sample S starts (step SA3). First, with the CPU 27 of the control unit 17, the XY scanning part 7 is driven, the Z scanning part 9 is moved in the Z forward path, and a laser beam is emitted from the light source unit 3. The laser beam emitted from the light source unit 3 passes through the dichroic mirror 21, is two-dimensionally scanned by the XY scanning part 7 along a plane intersecting the optical axis of the objective lens 5, and is radiated onto the sample S on the Z scanning part 9 moving in the Z forward path.

Then, as shown in FIG. 4A, while the scanning line is shifted by the galvanometer mirror in the sub scanning direction each time scanning of one line is performed by the resonant mirror of the XY scanning part 7 in the main scanning direction along a plane intersecting the optical axis of the objective lens 5, the scanning position of the laser beam is changed by the Z scanning part 9 in the Z forward path.

Fluorescence generated in the sample S as a result of being irradiated with the laser beam is collected by the objective lens 5, returns along the optical path of the laser beam via the XY scanning part 7, is reflected by the dichroic mirror 21, and is detected by the detector 11. Then, luminance information corresponding to the luminance of the detected fluorescence is output from the detector 11 and is sent to the image processing unit 13. In addition, with the CPU 27 of the control unit 17, scanning-position information, which indicates the XY-direction positions of the laser beam scanned by the XY scanning part 7 and the Z-direction position of the laser beam determined by the Z scanning part 9, is sent to the image processing unit 13. By doing so, an XY image of the sample S is acquired in the image processing unit 13 (step SA4).

Thus, the operation of shifting the scanning line to the end in the Y forward path by means of the XY scanning part 7 while the scanning position is being changed in the Z forward path and then returning the laser beam to the first scanning line in the Y forward path without scanning the laser beam is repeated, thus acquiring a plurality of XY images with different Z-direction positions in the sample S (step SA4, "YES" in step SA5, and "NO" in step SA7).

Then, as shown by the dashed-line arrows in FIG. 4A, when scanning of the last image acquisition line in the Z forward path is finished, only the Z scanning part 9 is driven, the galvanometer mirror of the XY scanning part 7 responsible for scanning in the sub scanning direction is halted, and the Z scanning part 9 is folded back to the Z return path, thereby reversing the orientation in which the scanning line in the sub scanning direction is shifted by the XY scanning part 7.

Next, while the scanning line is shifted by the galvanometer mirror in the opposite direction to the sub scanning direction each time scanning of one line is performed by the resonant mirror of the XY scanning part 7 in the main scanning direction along a plane intersecting the optical axis of the objective lens 5, the scanning position of the laser beam is changed by the Z scanning part 9 in the Z return path.

Then, fluorescence that is generated in the sample S as a result of being irradiated with the laser beam in the same manner as in the Z forward path is detected by the detector 11, thus acquiring an XY image of the sample S by means of the image processing unit 13 on the basis of the luminance information of the fluorescence and the scanning-position information (step SA4).

Then, in the Z return path ("NO" in step SA5), the XY image acquired in the Z return path is reversed, through image processing by means of the image processing unit 13, about an axial line along the main scanning direction (XY image reversed processing in step SA6).

Then, the operation of shifting the scanning line to the end in the Y return path by means of the XY scanning part 7 while the scanning position is being changed in the Z return path and then returning the laser beam to the first scanning line in the Y return path without scanning the laser beam is repeated, thus acquiring a plurality of XY images with different Z-direction positions in the sample S (step SA4, "NO" in step SA5, step SA6, "NO" in step SA7). Then, when scanning of the last image acquisition line in the Z return path is finished ("YES" in step SA7), image acquisition is completed.

As described above, according to the scanning laser microscope 1 of this embodiment, through the operation of the CPU 27 of the control unit 17, the orientation in which the scanning line in the sub scanning direction is shifted by the XY scanning part 7 is reversed between the Z forward path and the Z return path, as shown in FIG. 4A, thereby allowing the image acquisition planes in the Z forward path and the Z return path to coincide with each other. Also, reversing the orientation in which the scanning line in the sub scanning direction is shifted causes the XY images of planes intersecting the optical axis of the objective lens 5 to be reversed between the Z forward path and the Z return path. However, the orientations, in the sub scanning direction, of the XY images acquired in the Z forward path can be made to coincide with the orientations, in the sub scanning direction, of the XY images acquired in the Z return path by causing the control unit 17 to reverse, about an axial line along the main scanning direction, either the XY images in the Z forward path or the XY images in the Z return path generated by the image processing unit 13, as shown in FIG. 6. By doing so, a high-accuracy three-dimensional image can be acquired while still taking advantage of high scanning speed in the main scanning direction.

Moreover in this embodiment, by scanning a laser beam only in one direction in the sub scanning direction, XY images of planes intersecting the optical axis of the objective lens 5 can be acquired in a step-by-step manner while the Z scanning part 9 is temporally continuously shifting the scanning position of the laser beam along the Z direction. In this case, merely by switching the orientation in which the XY scanning part 7 shifts the scanning line in the sub scanning direction to the opposite direction when the Z-direction scanning position is folded back from the Z forward path to the Z return path, images whose orientations in the sub scanning direction are reversed by the XY scanning part 7 between the Z forward path and the Z return path can be acquired.

In addition, in this embodiment, the control unit 17 shifts the timings of the image acquisition timing signals relative to each other between the Z forward path and the Z return path so as to cause the XY scanning part 7 to scan the same plane both in the Z forward path and in the Z return path by using the image acquisition timing signals having the common signal waveform. This can avoid the acquisition of useless images that do not match between the Z forward path and the Z return path, making it possible to efficiently acquire images that match both in the Z forward path and in the Z return path.

Second Embodiment

Next, a scanning laser microscope according to a second embodiment of the present invention will be described.

As shown in FIG. 8A, the scanning laser microscope 1 according to this embodiment differs from the first embodiment in that a laser beam is scanned by the XY scanning part 7 in the main scanning direction both in the forward and return paths of the sub scanning direction.

The same components as those used in the scanning laser microscope 1 according to the first embodiment are denoted by the same reference signs, and thus descriptions thereof will be omitted.

As shown in FIG. 8A, in this embodiment, the CPU 27 scans a laser beam in the main scanning direction by means of the resonant mirror along both the forward and return paths of the sub scanning direction by means of the galvanometer mirror and also reverses the orientation in which the scanning line in the sub scanning direction is shifted by the galvanometer mirror at every foldback in the sub scanning direction.

Also, in the case of both the Z forward path and the Z return path, the scanning line is shifted from the first scanning line (1) to the last scanning line (N) in the Y forward path of the sub scanning direction, and the scanning line is shifted from the last scanning line (N) to the first scanning line (1) in the Y return path of the sub scanning direction. The Y forward path is also referred to as Y odd-number lines, and the Y return path is also referred to as Y even-number lines. Here, as shown by the solid-line arrows in FIG. 8A, in the case of both the Z forward path and the Z return path, the Y forward path and the Y return path both correspond to image acquisition segments. Furthermore, the dashed-line arrows in FIG. 8A indicate the timing at which image acquisition in the Z forward path finishes and image acquisition is switched to the Z return path, namely, a segment in which the moving orientation of the Z scanning part 9 in the Z direction is reversed (image non-acquisition segment in which driving is performed in the Z direction only (Y-direction scanning is suspended)). This segment is an image non-acquisition segment, and the galvanometer mirror of the XY scanning part 7 for scanning in the sub scanning direction is halted in this segment.

In addition, in this embodiment, as shown in FIG. 8B, image acquisition timings correspond to the leading and trailing edges of the waveform signals both in the Z forward path and in the Z return path. Also, the image acquisition timing signal for the Z forward path has a timing shifted from the timing of the image acquisition timing signal for the Z return path such that the same plane is scanned both in the Z forward path and in the Z return path using the image acquisition timing signals sharing the common signal waveform. More specifically, the timings of the image acquisition timing signals are shifted from each other between the Z forward path and the Z return path such that the Z position at which image acquisition starts is shifted by the Z-direction displacement by which the Z scanning part 9 moves while acquiring a single XY image.

In addition, the Y-axis driving signal has a driving pattern that causes the galvanometer mirror of the XY scanning part 7 to shift, in the case of both the Z forward path and the Z return path, the scanning line in the sub scanning direction for scanning in the Y forward path and to shift the scanning line in the opposite direction to the sub scanning direction for scanning in the Y return path. As shown in FIG. 8A, the Y forward path and the Y return path in the Z forward path, as well as the Y forward path and the Y return path in the Z return path, are all image acquisition segments.

In addition, by executing the image processing program, the CPU 27 controls image generation performed by the image processing unit 13, thereby applying image processing to reverse either the images in the Y forward path (Y odd-number lines) or the images in the Y return path (Y even-number lines) about an axial line along the main scanning direction (X direction). In this embodiment, the XY images acquired in the Y return path are reversed through image processing with reference to the XY images acquired in the Y forward path.

The operation of the scanning laser microscope 1 with the above-described structure will be described below with reference to the flowchart in FIG. 9.

When the sample S is to be observed with the scanning laser microscope 1 according to this embodiment, steps SA1 to SA4 are executed first, wherein, as shown in FIG. 8A, while the scanning line is being shifted by the galvanometer mirror in the sub scanning direction each time scanning of one line is performed by the resonant mirror of the XY scanning part 7 in the main scanning direction along a plane intersecting the optical axis of the objective lens 5, the scanning position of the laser beam is changed by the Z scanning part 9 in the Z forward path, thus acquiring an XY image of the sample S. Because this case corresponds to a Y odd-number line in the Z forward path ("YES" in step SA5 and "YES" in step SB5-1), reversed processing of the XY image by means of the image processing unit 13 is not performed.

Next, when the scanning line is shifted to the end in the Y forward path, the orientation in which the scanning line in the sub scanning direction is shifted is reversed, thus causing the laser beam to be folded back to the Y return path. Then, while the scanning line is being shifted by the galvanometer mirror in the opposite direction to the sub scanning direction each time scanning of one line is performed by the resonant mirror of the XY scanning part 7 in the main scanning direction along a plane intersecting the optical axis of the objective lens 5, the scanning position of the laser beam is changed by the Z scanning part 9 in the Z forward path, thus acquiring an XY image of the sample S ("NO" in step SA7 and step SA4). Because this case corresponds to a Y even-number line in the Z forward path ("YES" in step SA5 and "NO" in step SB5-1), the XY image acquired in the Y return path is subjected to reversed processing by means of the image processing unit 13 (step SA6).

Thus, while the scanning position is being changed in the Z forward path, the operation of scanning a laser beam in the main scanning direction by means of the XY scanning part 7 along both the forward and return paths of the sub scanning direction and also reversing, at every foldback in the sub scanning direction, the orientation in which the scanning line in the sub scanning direction is shifted by the galvanometer mirror is repeated, thus acquiring a plurality of XY images with different Z-direction positions in the sample S both in the forward and return paths of the sub scanning direction. Then, as shown by the dashed-line arrows in FIG. 8A, when scanning of the last image acquisition line in the Z forward path is finished ("NO" in step SA7), only the Z scanning part 9 is driven, the galvanometer mirror of the XY scanning part 7 responsible for scanning in the sub scanning direction is halted, and the Z scanning part 9 is folded back to the Z return path.

Then, as shown in FIG. 8A, while the scanning line is being shifted by the galvanometer mirror in the sub scanning direction each time scanning of one line is performed by the resonant mirror of the XY scanning part 7 in the main scanning direction along a plane intersecting the optical axis of the objective lens 5, the scanning position of the laser beam is changed by the Z scanning part 9 in the Z return path, thus acquiring an XY image of the sample S (step SA4). Because this case corresponds to a Y odd-number line in the Z return path ("NO" in step SA5 and "NO" in step SB5-2), reversed processing of the XY image by means of the image processing unit 13 is not performed.

Next, when the scanning line is shifted to the end in the Y forward path, the orientation in which the scanning line in the sub scanning direction is shifted is reversed, thus causing the laser beam to be folded back to the Y return path. Then, while the scanning line is being shifted by the galvanometer mirror in the opposite direction to the sub scanning direction each time scanning of one line is performed by the resonant mirror of the XY scanning part 7 in the main scanning direction along a plane intersecting the optical axis of the objective lens 5, the scanning position of the laser beam is changed by the Z scanning part 9 in the Z return path, thus acquiring an XY image of the sample S ("NO" in step SA7 and step SA4). Because this case corresponds to a Y even-number line in the Z return path ("NO" in step SA5 and "YES" in step SB5-2), the XY image acquired in the Y return path is subjected to reversed processing by means of the image processing unit 13 (step SA6).

Then, while the scanning position is being changed in the Z return path, the operation of scanning a laser beam in the main scanning direction by means of the XY scanning part 7 along both the forward and return paths of the sub scanning direction and also reversing, at every foldback in the sub scanning direction, the orientation in which the scanning line in the sub scanning direction is shifted by the galvanometer mirror is repeated, thus acquiring a plurality of XY images with different Z-direction positions in the sample S both in the forward and return paths of the sub scanning direction. Then, when the last image acquisition line in the Z return path is finished ("YES" in step SA7), image acquisition is completed.

As described above, according to the scanning laser microscope 1 of this embodiment, scanning a laser beam in the main scanning direction both in the forward and return paths of the sub scanning direction makes it possible to eliminate the wasteful time of returning the laser beam to a scanning line without performing scanning, compared with a case where the laser beam is scanned only in one direction in the sub scanning direction.

For example, if the scanning speed in the sub scanning direction is not sufficiently high, the Z-direction scanning position is changed by the Z scanning part 9 while the laser beam is being returned to a scanning line without performing scanning, making it impossible to acquire an image of the region corresponding to this time period. Scanning a laser beam both in the forward and return paths of the sub scanning direction makes it possible to eliminate regions in which images cannot be acquired due to a change in the Z-direction scanning position. In addition, because the same XY positional relationship can also be established in the Y return path as that in the Y forward path, it is possible to acquire images of a larger number of Z regions.

In this embodiment, whether or not to perform reversed processing by means of the image processing unit 13 is switched depending on whether the path is the Z forward path or the Z return path and furthermore depending on whether the scanning line is a Y odd-number line or a Y even-number line, as shown in the flowchart in FIG. 9. Instead of this, the CPU 27 may control the image processing unit 13 so that, regardless of whether the path is the Z forward path or the Z return path, XY images acquired in the Y forward path are not subjected to reversed processing and XY images acquired in the Y return path are subjected to reversed processing.

Although the embodiments of the present invention have been described in detail with reference to the drawings, the specific structure is not limited to those of these embodiments but includes design changes etc. that do not depart from the spirit of the present invention. The present invention is not limited to the invention applied to each of the above-described embodiments and modifications but can be applied to, for example, embodiments in which these embodiments and modifications are appropriately combined and is not particularly limited.

In addition, although each of the above-described embodiments has been described by way of an example where the upright scanning laser microscope 1 is used as the scanning laser microscope, instead of this, for example, an inverted microscope may be employed. In addition, each of the above-described embodiments has been described by way of an example where the scanning-position changing part is realized by the Z scanning part 9, which also serves as a stage for moving the sample S in a direction along the optical axis of the objective lens 5. Instead of this, for example, a driving mechanism for moving the objective lens 5 in a direction along the optical axis may be employed.

Consequently, the following aspects are derived from the above-described embodiments.

One aspect of the present invention is a scanning laser microscope including: an objective lens for irradiating a specimen with a laser beam emitted from a light source; a scanning part for two-dimensionally scanning the laser beam radiated through the objective lens on the specimen; a scanning-position changing part for changing a scanning position of the laser beam in a direction along an optical axis of the objective lens during scanning by means of the scanning part; a detection unit that detects observation light from the specimen irradiated with the laser beam and that outputs luminance information corresponding to the luminance of the observation light; an image generation unit for generating an image on the basis of the luminance information output from the detection unit and scanning-position information indicating the scanning position of the laser beam, determined by the scanning part and the scanning-position changing part; and a control unit for controlling the scanning part, the scanning-position changing part, and the image generation unit, wherein while the control unit shifts a scanning line by means of the scanning part in a sub scanning direction intersecting a main scanning direction which is along a plane intersecting the optical axis of the objective lens each time the control unit scans one line by means of the scanning part in the main scanning direction, the control unit changes the scanning position in forward and return paths of the direction along the optical axis by means of the scanning-position changing part, reverses, between the forward path and the return path of the direction along the optical axis, an orientation in which the scanning line in the sub scanning direction is shifted by the scanning part, and reverses, about an axial line along the main scanning direction, either an image of the plane in the forward path or an image of the plane in the return path generated by the image generation unit.

According to this aspect, the scanning position of the laser beam is shifted by the scanning-position changing part in the forward and return paths of the direction along the optical axis of the objective lens while the laser beam emitted from the light source is two-dimensionally scanned by the scanning part on the specimen along the plane intersecting the optical axis of the objective lens, and a three-dimensional image of the specimen is generated by the image generation unit on the basis of the luminance information of observation light detected by the detection unit and the scanning-position information determined by the scanning part and the scanning-position changing part. By doing so, both in the forward path and the return path of the direction along the optical axis of the objective lens, respective three-dimensional images of the specimen can be acquired.

In this case, the control unit can make image acquisition planes in the forward path and the return path coincide with each other by reversing, between the forward path and the return path of the direction along the optical axis of the objective lens, the orientation in which the scanning line in the sub scanning direction is shifted by the scanning part. Also, reversing the orientation in which the scanning line in the sub scanning direction is shifted causes the images of planes intersecting the optical axis of the objective lens to be reversed between the forward path and the return path of the direction along the optical axis of the objective lens. However, the orientations, in the sub scanning direction, of the images of the planes acquired in the forward path can be made to coincide with the orientations, in the sub scanning direction, of the images of the planes acquired in the return path by causing the control unit to reverse, about an axial line along the main scanning direction, either the images of the planes in the forward path or the images of the planes in the return path generated by the image generation unit. By doing so, a high-accuracy three-dimensional image can be acquired while still taking advantage of high scanning speed in the main scanning direction.

In the above-described aspect, the control unit may repeat the operation of causing the scanning part to shift the scanning line to the end in the sub scanning direction and to return the laser beam to the first scanning line in the sub scanning direction without scanning the laser beam and, when the scanning position changed by the scanning-position changing part reaches the end in the forward path, may reverse the orientation in which the scanning line in the sub scanning direction is shifted by the scanning part and fold back the scanning position changed by the scanning-position changing part to the return path.

With this structure, two-dimensional images of planes intersecting the optical axis of the objective lens can be acquired in a step-by-step manner while the scanning-position changing part is temporally continuously shifting the scanning position of the laser beam in the direction along the optical axis of the objective lens. In this case, merely by switching the orientation in which the scanning part shifts the scanning line in the sub scanning direction to the opposite direction when the scanning position, in the direction along the optical axis of the objective lens, changed by the scanning-position changing part is folded back from the forward path to the return path, images whose orientations in the sub scanning direction are reversed by the scanning part between the forward path and the return path of the direction along the optical axis of the objective lens can be acquired.

In the above-described aspect, the control unit may scan the laser beam in the main scanning direction in the forward and return paths of the sub scanning direction by means of the scanning part and may reverse the orientation in which the scanning line in the sub scanning direction is shifted by the scanning part at every foldback in the sub scanning direction.

This structure makes it possible to eliminate the wasteful time of returning the laser beam to a scanning line without scanning the laser beam, compared with a case where the laser beam is scanned only in one direction in the sub scanning direction. For example, if the scanning speed in the sub scanning direction is not sufficiently high, the scanning position in the direction along the optical axis of the objective lens is changed by the scanning-position changing part while the laser beam is being returned to a scanning line without performing scanning, making it impossible to acquire an image of the region corresponding to this time period. Scanning a laser beam both in the forward and return paths of the sub scanning direction makes it possible to eliminate regions in which images cannot be acquired due to a change in the scanning position in the direction along the optical axis of the objective lens.

In the above-described aspect, the control unit may shift, between the forward path and the return path, timings of image acquisition timing signals having a common signal waveform so as to scan the same plane between the forward path and the return path of the direction along the optical axis by means of the scanning part using the image acquisition timing signals.

This structure can avoid the acquisition of useless images that do not match between the forward path and the return path of the direction along the optical axis of the objective lens, making it possible to efficiently acquire images that match both in the forward path and in the return path of the direction along the optical axis of the objective lens.

The present invention affords an advantage in that a high-accuracy three-dimensional image can be acquired while still taking advantage of high scanning speed in the main scanning direction.

REFERENCE SIGNS LIST

1 Scanning laser microscope
5 Objective lens
7 XY scanning part (scanning part)
9 Z scanning part (scanning-position changing part)
11 Detector (detection unit)
13 Image processing unit (image generation unit)
17 Control unit
S Sample (specimen)

The invention claimed is:

1. A scanning laser microscope comprising:
an objective lens through which a specimen is irradiated with a laser beam emitted from a light source; an XY scanner that two-dimensionally scans the laser beam radiated through the objective lens on the specimen;
a Z scanner that changes a scanning position of the laser beam in a direction along an optical axis of the objective lens during scanning by means of the XY scanner;
a detector that detects observation light from the specimen irradiated with the laser beam and that outputs luminance information corresponding to the luminance of the observation light;
an image processor that generates an image on the basis of the luminance information output from the detector and scanning-position information indicating the scanning position of the laser beam, determined by the XY scanner and the Z scanner; and
a controller that controls the XY scanner, the Z scanner, and the image processor,
wherein, while the controller shifts a scanning line by means of the XY scanner in a sub scanning direction intersecting a main scanning direction which is along a plane intersecting the optical axis of the objective lens each time the controller scans one line by means of the XY scanner in the main scanning direction, the controller changes the scanning position in forward and return paths of the direction along the optical axis by means of the Z scanner, reverses, between the forward path and the return path of the direction along the optical axis, an orientation in which the scanning line in the sub scanning direction is shifted by the XY scanner, and reverses, by rotating about an axial line along the main scanning direction, either an image of the plane in the forward path or an image of the plane in the return path generated by the image processor.

2. The scanning laser microscope according to claim 1, wherein the controller repeats the operation of causing the XY scanner to shift the scanning line to the end in the sub scanning direction and to return the laser beam to the first scanning line in the sub scanning direction without scanning the laser beam and, when the scanning position changed by the Z scanner reaches the end in the forward path, reverses the orientation in which the scanning line in the sub scanning direction is shifted by the XY scanner and folds back the scanning position changed by the Z scanner to the return path.

3. The scanning laser microscope according to claim 1, wherein the controller scans the laser beam in the main scanning direction in the forward and return paths of the sub scanning direction by means of the XY scanner and reverses the orientation in which the scanning line in the sub scanning direction is shifted by the XY scanner at every foldback in the sub scanning direction.

4. The scanning laser microscope according to claim 1, wherein the controller shifts, between the forward path and the return path, timings of image acquisition timing signals having a common signal waveform so as to scan the same plane between the forward path and the return path of the direction along the optical axis by means of the XY scanner using the image acquisition timing signals.

* * * * *